United States Patent
Chi et al.

(10) Patent No.: US 11,339,090 B2
(45) Date of Patent: May 24, 2022

(54) GLASS SUBSTRATE PROCESSING METHODS

(71) Applicant: CORNING INCORPORATED, Corning, NY (US)

(72) Inventors: Tien San Chi, Taichung (TW); Chih Yuan Lu, Kaohsiung County (TW); Cheng-Da Tsai, Kaohsiung-si (TW); Yu Ying Tsai, Hsinchu (TW); Shan Zhu, JiangMen (CN)

(73) Assignee: CORNING INCORPORATED, Corning, NY (US)

( * ) Notice: Subject to any disclaimer, the term of this patent is extended or adjusted under 35 U.S.C. 154(b) by 533 days.

(21) Appl. No.: 16/439,092

(22) Filed: Jun. 12, 2019

(65) Prior Publication Data

US 2019/0382307 A1    Dec. 19, 2019

(30) Foreign Application Priority Data

Jun. 15, 2018    (CN) .......................... 201810618553.1

(51) Int. Cl.
*C03C 23/00*    (2006.01)
*C03C 21/00*    (2006.01)
*C03C 4/00*    (2006.01)

(52) U.S. Cl.
CPC ........ *C03C 23/0095* (2013.01); *C03C 21/002* (2013.01); *C03C 21/005* (2013.01); *C03C 4/00* (2013.01); *C03C 2203/20* (2013.01); *C03C 2204/02* (2013.01)

(58) Field of Classification Search
None
See application file for complete search history.

(56) References Cited

U.S. PATENT DOCUMENTS

| | | | |
|---|---|---|---|
| 8,034,732 B2 | 10/2011 | Kobayashi et al. | |
| 8,586,492 B2 | 11/2013 | Barefoot et al. | |
| 8,765,262 B2 | 7/2014 | Gross | |
| 8,969,226 B2 | 3/2015 | Dejneka et al. | |
| 9,028,962 B2 | 5/2015 | Borrelli et al. | |
| 9,290,413 B2 | 3/2016 | Dejneka et al. | |
| 9,346,703 B2 | 5/2016 | Bookbinder et al. | |
| 9,439,439 B2 | 9/2016 | Borrelli et al. | |
| 9,517,967 B2 | 12/2016 | Dejneka et al. | |
| 9,567,259 B2 | 2/2017 | Amin et al. | |
| 2006/0010395 A1 | 1/2006 | Aaltonen | |

(Continued)

FOREIGN PATENT DOCUMENTS

| CA | 2653511 A1 | 12/2007 |
|---|---|---|
| CN | 1603432 A | 4/2005 |

(Continued)

OTHER PUBLICATIONS

International Search Report and Written Opinion of the International Searching Authority; PCT/US2019/036683; dated Aug. 6, 2019; 9 Pages; European Patent Office.

*Primary Examiner* — Queenie S Dehghan
(74) *Attorney, Agent, or Firm* — John P. McGroarty

(57) ABSTRACT

Described is a method of processing an antimicrobial glass substrate. More particularly, described is a method of removing one or more of silver nitrate or silver oxide on the surface of an antimicrobial glass substrate. Also described is a method of manufacturing a glass substrate that is substantially free of yellow discoloration.

20 Claims, 1 Drawing Sheet

(56) References Cited

U.S. PATENT DOCUMENTS

| | | | |
|---|---|---|---|
| 2008/0210256 A1* | 9/2008 | Kretschmer | C23G 3/023 134/1 |
| 2010/0004111 A1 | 1/2010 | Kobayashi et al. | |
| 2010/0071415 A1 | 3/2010 | Voss et al. | |
| 2014/0017462 A1 | 1/2014 | Borrelli et al. | |
| 2014/0370303 A1 | 12/2014 | Jin et al. | |
| 2015/0208664 A1 | 7/2015 | Borrelli et al. | |
| 2015/0225287 A1 | 8/2015 | Amin et al. | |
| 2016/0015026 A1 | 1/2016 | Lee et al. | |
| 2017/0354996 A1* | 12/2017 | Lim | B08B 3/003 |

FOREIGN PATENT DOCUMENTS

| | | |
|---|---|---|
| CN | 101389577 A | 3/2009 |
| CN | 101817086 A | 9/2010 |
| CN | 102031378 A | 4/2011 |
| CN | 102795756 A | 11/2012 |
| CN | 103443042 A | 12/2013 |
| CN | 105228967 A | 1/2016 |
| DE | 102006026033 A1 | 12/2007 |
| EP | 2021296 A1 | 2/2009 |
| EP | 2691344 A2 | 2/2014 |
| EP | 2953910 A1 | 12/2015 |
| JP | 2008-506194 A | 2/2008 |
| JP | 4212642 B2 | 1/2009 |
| JP | 2014-511814 A | 5/2014 |
| JP | 6038117 B2 | 12/2016 |
| KR | 2014-0023328 A | 2/2014 |
| KR | 10-2016-0010739 A | 1/2016 |
| TW | 200736184 A | 10/2007 |
| TW | I348461 B | 9/2011 |
| TW | 201245089 A | 11/2012 |
| TW | I540111 B | 7/2016 |
| WO | 2007/108245 A1 | 9/2007 |
| WO | 2007/137823 A1 | 12/2007 |
| WO | 2012/135294 A2 | 10/2012 |
| WO | 2014/124348 A1 | 8/2014 |

* cited by examiner

GLASS SUBSTRATE PROCESSING METHODS

CROSS-REFERENCE TO RELATED APPLICATIONS

This application claims the benefit of priority under 35 U.S.C. § 119 of Chinese Patent Application Serial No. 201810618553.1 filed on Jun. 15, 2018, the content of which is relied upon and incorporated herein by reference in its entirety.

TECHNICAL FIELD

Embodiments of the present disclosure pertain to the field of antimicrobial glass substrates. More particularly, embodiments described herein relate to processing glass substrates such that processed glass substrates exhibit antimicrobial properties, as well as methods of making, using, and cleaning glass substrates.

BACKGROUND

Touch-activated or touch-interactive devices, such as screen surfaces (e.g., surfaces of electronic devices having user-interactive capabilities that are activated by touching specific portions of the surfaces), have become increasingly more prevalent. In general, these surfaces should exhibit high optical transmission, low haze, and high durability, among other features. As the extent to which the touch screen-based interactions between a user and a device increases, so too does the likelihood of the surface harboring microorganisms (e.g., bacteria, fungi, viruses, and the like) that can be transferred from user to user.

To minimize the presence of microbes on glass, so-called "antimicrobial" properties have been imparted to a variety of glass substrates. Such antimicrobial glass substrates, regardless of whether they are used as screen surfaces of touch-activated devices or in other applications, have a propensity to discolor for various reasons. For example, one reason includes the presence of silver particles (including nanometer-sized silver particles) on the surface of the glass or the presence of reduced silver due to exposure to elevated temperatures, humidity, reactive environments, and/or the like. These harsh conditions can occur during fabrication or processing of the glass substrates, or during ordinary use of the articles. In certain cases, this discoloration can render a glass substrate unsightly. Further, excessive discoloration ultimately can lead to the glass substrate becoming unsuitable for its intended purpose.

Therefore, there remains a need for methods that provide antimicrobial glass substrates with improved resistance against discoloration. It would be particularly advantageous if such methods did not adversely affect other desirable properties of the surfaces (e.g., optical transmission, haze, strength, scratch resistance, and the like).

SUMMARY

Described herein are methods of processing glass substrates that have improved resistance to discoloration.

A first aspect includes a method of processing a glass substrate, the method comprising in a first ultrasonic tank, contacting a glass substrate comprising one or more of silver nitrate and silver oxide with a solution comprising halide ions to form glass substrate comprising silver halide; operating the first ultrasonic tank at a first frequency; in a second ultrasonic tank, contacting the glass substrate comprising silver halide with a detergent solution comprising a phosphate salt to remove the silver halide from the glass substrate; and operating the second ultrasonic tank at a second frequency greater than the first frequency.

A second aspect according to the first aspect, wherein the method does not utilize mechanical scrubbing to remove silver halide or one or more of silver nitrate and silver oxide from the glass substrate.

A third aspect according to the first or second aspect, wherein the solution comprises a range of from about 0.01 to about 5 wt. % halide ions.

A fourth aspect according to the third aspect, wherein the solution is selected from the group consisting of sodium chloride solution, sodium fluoride solution, sodium bromide solution, sodium iodide solution, potassium chloride solution, potassium fluoride solution, potassium bromide solution, potassium iodide solution, lithium fluoride solution, lithium chloride solution, lithium bromide solution, lithium iodide solution, ammonium chloride solution, and combinations thereof.

A fifth aspect according to the fourth aspect, wherein the solution is a sodium chloride solution.

A sixth aspect according to any preceding aspects, wherein the detergent solution comprises a range of from about 5 to about 10 wt. % detergent.

A seventh aspect according to any preceding aspects, wherein the phosphate salt is selected from the group consisting of sodium phosphate, sodium tripolyphosphate, sodium trimetaphosphate, sodium triphosphate, sodium hexametaphosphate, sodium pyrophosphate, potassium pyrophosphate, potassium phosphate, potassium triphosphate, potassium polymetaphosphate, and combinations thereof.

An eighth aspect according to any preceding aspects, wherein the first ultrasonic tank and the second ultrasonic tank, independently, are operated at a temperature in a range of from about 22° C. to about 70° C. and there is a ratio of the second frequency to the first frequency greater than or equal to 1.5.

A ninth aspect according to any preceding aspects, wherein the glass substrate is contacted with the solution comprising halide ions for a period of time in a range of from about 5 to about 10 minutes.

A tenth aspect according to any preceding aspects, wherein the glass substrate comprising silver halide is contacted with the detergent solution for a period of time in a range of from about 5 to about 10 minutes.

An eleventh aspect according to any preceding aspects, further comprising rinsing the glass substrate with deionized water after the contacting with the detergent solution to form a rinsed glass substrate.

A twelfth aspect according to the eleventh aspects, wherein the antimicrobial glass substrate is rinsed in deionized water for a period of time in a range of from about 5 to about 10 minutes.

A thirteenth aspect according to the eleventh or twelfth aspect, further comprising drying the glass substrate after the rinsing.

A fourteenth aspect according to the thirteenth aspect, wherein the dried glass substrate is substantially free of yellow marks.

A fifteenth aspect according to any of the preceding aspects, wherein the first ultrasonic tank is operated at a frequency in a range of from about 20 to about 40 kHz and the second ultrasonic tank is operated at a frequency of from about 60 to about 120 kHz.

A sixteenth aspect according to any of the preceding aspects, wherein when the glass substrate is exposed to the halide ions, the halide ions react with one or more of silver nitrate and silver oxide to precipitate silver halide onto the glass substrate.

A seventeenth aspect according to any of the preceding aspects, wherein the detergent solution prevents the silver halide from re-depositing on a surface of the glass substrate.

An eighteenth aspect according to any of the preceding aspects, wherein the glass substrate comprises a chemically strengthened glass.

A nineteenth aspect including a method of manufacturing an antimicrobial glass substrate comprising: ion-exchanging silver into a glass substrate to form an antimicrobial glass substrate comprising one or more of silver nitrate and silver oxide; in a first ultrasonic tank, contacting the antimicrobial glass substrate comprising one or more of silver nitrate and silver oxide with a solution comprising halide ions to form an antimicrobial glass substrate comprising silver halide, operating the first ultrasonic tank at a frequency in a range of from about 20 to about 40 kHz, then in a second ultrasonic tank, contacting the antimicrobial glass substrate comprising silver halide with a detergent solution comprising a phosphate salt to remove the silver halide, operating the second ultrasonic tank at a frequency in a range of from about 60 to about 120 kHz;

rinsing the antimicrobial glass substrate in deionized water to form a rinsed antimicrobial glass substrate; and drying the rinsed antimicrobial glass substrate to form a dried antimicrobial glass that is substantially free of silver nitrate, silver oxide, and silver halide.

A twentieth aspect according to the nineteenth aspect, wherein the solution is selected from the group consisting of sodium chloride solution, sodium fluoride solution, sodium bromide solution, sodium iodide solution, potassium chloride solution, potassium fluoride solution, potassium bromide solution, potassium iodide solution, lithium fluoride solution, lithium chloride solution, lithium bromide solution, lithium iodide solution, ammonium chloride solution, and combinations thereof.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments. The embodiments as described herein are illustrated by way of example and not limitation in the figures of the accompanying drawings in which like references indicate similar elements.

DETAILED DESCRIPTION

Figure 1:
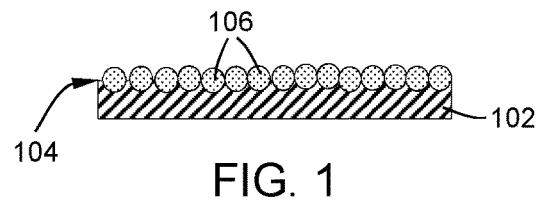
FIG. 1 illustrates a cross-sectional view of a glass substrate according to one or more embodiments.

Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

Described herein are methods of processing antimicrobial glass substrates that exhibit less yellowing compared to substrates processed according to existing methods, while exhibiting the same antimicrobial efficacy and strength. As used herein, the term "antimicrobial" refers to the ability to kill or inhibit the growth of more than one species of more than one type of microbe (e.g., bacteria, viruses, fungi, and the like). The term as used herein does not mean it will kill or inhibit the growth of all species of microbes within such families, but that it will kill or inhibit the growth or one or more species of microbes from such families. When an agent is described as being "antibacterial, or "antiviral" or "antifungal," it means that the agent will kill or inhibit the growth of only bacteria, viruses, or fungi, respectively.

As used herein the term "Log Reduction" or "LR" means $-\text{Log}(C_a/C_0)$, where $C_a$=the colony form unit (CFU) number of the antimicrobial surface containing silver (Ag) particles/nanoparticles and $C_0$=the colony form unit (CFU) of the control glass surface that does not contain Ag particles/nanoparticles. That is:

$$LR=-\text{Log}(C_a/C_0).$$

As an example, a Log Reduction of 3=99.9% of the bacteria or virus killed and a Log Reduction of 5=99 0.999% of bacteria or virus killed.

As used herein, the term "yellowing" refers to optical changes in a glass substrate such that yellow coloration in the visible light region and the formation of adsorption bands in the infrared and/or ultraviolet regions results in a yellow color to the naked eye. Additionally, when a glass substrate is "yellowed," optical density may increase. For an optically smooth surface, discoloration is generally close to zero. In those situations when an antimicrobial glass substrate is used in the construction of a touch screen for an electronic device, the discoloration of the antimicrobial glass substrate can be less than or equal to about 1%.

Discoloration, particularly yellowing, in antimicrobial glass substrates can occur when there is a residue on a surface thereof. In some instances, the residue imparts yellowing of the surface of the antimicrobial glass substrate. According to one or more embodiments, the residue can include particulates, which can include silver, e.g. silver nitrate and/or silver oxide. In one or more embodiments, discoloration can also occur in the antimicrobial glass substrates when a glass substrate provides an electron to an $Ag^+$ ion, thus reducing the $Ag^+$ ion to $Ag^0$. $Ag^0$ provides poor antimicrobial activity as compared to $Ag^+$ Reduced $Ag^0$ also shows a distinct plasmon resonance peak at 430 nm, which appears as a color change (yellowing) to the eye of an observer. Electrons may be present or formed in the glass substrate from sources, such as exposure to ultraviolet light. These electrons may cause $Ag^+$ ions or other metal ions present in the glass to reduce and thus, cause discoloration (yellowing) of the glass substrate.

The glass substrate can be an amorphous glass substrate or a glass ceramic substrate, which has an amorphous phase and one or more crystalline phases. The glass substrate can be any glass or glass-ceramic which can be ion-exchanged to introduce silver ions to form an antimicrobial glass substrate. For example, the composition chosen can be any of a wide range of silicate, borosilicate, aluminosilicate, or boroaluminosilicate compositions, which comprise one or more alkali metal oxides. Exemplary compositions include those described in U.S. Pat. Nos. 8,969,226; 8,586,492; 9,346,703; 9,290,413; 8,765,262; and 9,517,967, the contents of each of is incorporated herein by reference in its entirety.

Glass substrates processed according to one or more embodiments can adopt a variety of physical forms. That is, from a cross-sectional perspective, the substrate can be flat or planar, or it can be curved and/or sharply-bent. Similarly, it can be a single unitary object, or a multi-layered structure or a laminate.

In addition, glass substrate according to one or more embodiments include an antimicrobial silver-containing layer or region that extends inward from a surface of the glass substrate to a specific depth therein. The antimicrobial silver-containing region comprises cationic monovalent silver ($Ag^+$) in an amount effective to impart antimicrobial behavior to the glass substrate. In general, the antimicrobial silver-containing region, like a compressive stress layer, extends inward from the surface of the glass substrate. Thus, the antimicrobial silver-containing region at least partially overlaps with a compressive stress layer. In some embodiments, the depth of the compressive stress layer is greater than the depth of the antimicrobial silver-containing region. In other embodiments, the depth of the compressive stress layer and the depth of the antimicrobial silver-containing region are about the same. The depth of the antimicrobial silver-containing region (DOR) may generally be limited so as to avoid visible coloration (i.e. yellowing) in the glass substrate and to maximize the antimicrobial efficacy of the cationic silver within the glass substrate.

In certain embodiments, the antimicrobial glass substrates can include an additional layer disposed on the surface of the glass substrate. The optional additional layer(s) can be used to provide additional features to the antimicrobial glass substrate (e.g., reflection resistance or anti-reflection properties, glare resistance or anti-glare properties, fingerprint resistance or anti-fingerprint properties, smudge resistance or anti-smudge properties, color, opacity, environmental barrier protection, electronic functionality, and/or the like). Materials that can be used to form the optional additional layer(s) generally are known to those skilled in the art to which this disclosure pertains.

When silver ions ($Ag^+$) have been ion-exchanged into a glass substrate, the glass substrate has antimicrobial properties. In one or more embodiments, the glass substrate may comprise an ion-exchanged glass substrate, where silver ions have been ion-exchanged into the glass substrate. In one or more embodiments, the glass substrate comprises a chemically strengthened glass that has been ion-exchanged with silver.

Silver ions ($Ag^+$) may be ion-exchanged into a glass substrate by treating a glass substrate with a solution of silver nitrate. In one or more embodiments, metal nanoparticles of silver are synthesized in a glass matrix by one or more of direct ion implantation, sol-gel methods, and ion exchange.

In one or more embodiments, silver ions are introduced into/on a glass substrate through an ion-exchange process. In one or more embodiments, a glass substrate is immersed into a molten salt, and additional processing, such as light irradiation or thermal annealing, then follows to generate particles of silver. With such processing methods, the silver particles are often only formed on the surface of the glass substrate and not distributed throughout the glass substrate. In methods, such as a double-ion exchange method (wherein silver ions are ion exchanged either before or after an ion exchange process introducing alkali metal ions such as sodium or potassium into the surface of the glass substrate), silver nanoparticles can be embedded into the glass substrate.

Regardless of which type of processing method is used to incorporate silver ions into a glass substrate to create an antimicrobial glass substrate, as a result of the processing, particles of silver nitrate often remain on the top surface of the glass substrate. When residual silver nitrate is exposed to an atmosphere of air or light, the silver nitrate readily undergoes an oxidation-reduction reaction to form silver oxide. Silver oxide present on the surface of an antimicrobial glass surface discolors the glass, making the glass yellow. Yellowing of a glass substrate is undesirable because the antimicrobial glass substrate unsightly. Further, excessive discoloration (i.e. yellowing) ultimately can lead to the glass substrate becoming unsuitable for its intended purpose. The major challenge, thus, becomes how to remove the residual silver nitrate from the antimicrobial glass substrate.

Further complicating matters, silver oxide, which causes the discoloration, is difficult to remove from the surface on an antimicrobial glass substrate because silver oxide has limited solubility in water. Conventionally, mechanical brushing in the presence of an ammonia and/or hydrogen peroxide solution, which is capable of dissolving both silver oxide and silver nitrate, is used to clean an antimicrobial glass substrate and remove the yellow discoloration. Such washing and mechanical brushing steps, however, are not suitable for different sizes of glass. Glass sizes of substrates being processed can vary. For example, in some embodiments, the width of the glass substrate can be from about 20 mm to about 4000 mm, such as from about 50 mm to about 4000 mm, such as from about 100 mm to about 4000 mm, such as from about 500 mm to about 4000 mm, such as from about 1000 mm to about 4000 mm, such as from about 2000 mm to about 4000 mm, such as from about 3000 mm to about 4000 mm, such as from about 20 mm to about 3000 mm, such as from about 50 mm to about 3000 mm, such as from about 100 mm to about 3000 mm, such as from about 500 mm to about 3000 mm, such as from about 1000 mm to about 3000 mm, such as from about 2000 mm to about 3000 mm, such as from about 2000 mm to about 2500 mm, and all ranges and subranges therebetween.

In some embodiments, the height of the glass substrate can be from about 20 mm to about 4000 mm, such as from about 50 mm to about 4000 mm, such as from about 100 mm to about 4000 mm, such as from about 500 mm to about 4000 mm, such as from about 1000 mm to about 4000 mm, such as from about 2000 mm to about 4000 mm, such as from about 2500 mm to about 4000 mm, such as from about 20 mm to about 3000 mm, such as from about 50 mm to about 3000 mm, such as from about 100 mm to about 3000 mm, such as from about 500 mm to about 3000 mm, such as from about 1000 mm to about 3000 mm, such as from about 2000 mm to about 3000 mm, such as from about 2000 mm to about 2500 mm, and all ranges and subranges therebetween.

Mechanical brushing is limited by the size of the antimicrobial glass substrate. Depending upon the size of the antimicrobial glass substrate, there may be a gap between roller and roller, and there may be a gap between upper brush and bottom brush, which could affect the cleaning ability and the transmission stability of the mechanical brushing. Additionally, the cost of ammonia and/or hydrogen peroxide solution based detergents is high, and the waste water produced from using such detergents requires special treatment due to the adverse effects of ammonia and hydrogen peroxide.

One or more embodiments provide a method of removing the residual silver nitrate and silver oxide, and, hence, the yellow discoloration from a glass substrate.

Figure 2:
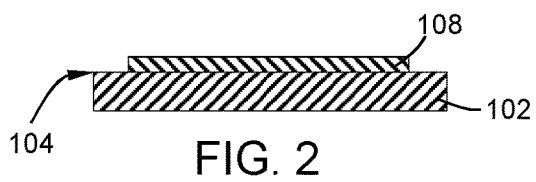
FIG. 2 illustrates a cross-sectional view of a glass substrate according to one or more embodiments.

FIGS. 1-4 illustrate a cross-sectional view of an antimicrobial glass substrate 102 processed according to a method of one or more embodiments. Referring to FIG. 1, an antimicrobial glass substrate 102 has particles of silver nitrate ($AgNO_3$) 106 on the top surface 104 of the antimicrobial glass substrate 102. Referring to FIG. 2, in one or more embodiments, the particles of silver nitrate 106 on the top surface 104 of the antimicrobial glass substrate 102 oxidize (due to exposure to an atmosphere of air or light) to form a film of silver oxide ($Ag_2O$) 108 on the antimicrobial glass substrate 102. In one or more embodiments, the silver oxide film 108 is yellow in color. The yellow color may be visible upon human inspection.

In one or more embodiments, in a first ultrasonic tank 103, an antimicrobial glass substrate comprising one or more of silver nitrate and silver oxide is contacted with a solution comprising halide ions. In one embodiment, the first ultrasonic tank 103 (i.e. the ultrasonic tank containing the solution of halide ions) is operated at a frequency in a range of from about 20 to about 40 kHz. According to one or more embodiments, "contacting" refers to the substrate being wetted by the solution. In some embodiment, "contacting" refers to submersing the substrate in a bath of the solution or dipping at least a portion of the substrate in the solution. Without intending to be bound by theory, it is thought that a lower ultrasonic frequency for the first ultrasonic tank 103 containing the solution of halide ions leads to a high cavitation bubble energy, which aids in the formation/precipitation of silver halide particles on the surface of the glass substrate. In one or more embodiments, the temperature of the first ultrasonic tank 103 is in a range of from about 22° C. to about 70° C., including a range of from about 22° C. to about 60° C., and from about 25° C. to about 60° C. It is noted that about 22° C. to about 25° C. is recognized by those skilled in the art as being room/ambient temperature. In one or more embodiments, the antimicrobial glass substrate is contacted with the solution comprising halide ions for a period of time in a range of from about 5 to about 15 minutes. In one or more embodiments, the antimicrobial glass substrate is contacted with the solution comprising halide ions for a period of time in a range of from about 5 minutes to about 10 minutes. In some embodiments, the antimicrobial glass substrate is contacted with the solution comprising halide ions for a period of time of about 10 minutes.

In one or more embodiments, the solution of halide ions comprises a range of from about 0.01 to about 5 wt. % halide ions. In an embodiment, the solution of halide ions comprises a range of from about 0.01 to about 5 wt. % halide ions dissolved in water. In one or more embodiments, the solution of halide ions is selected from sodium chloride solution, sodium fluoride solution, sodium bromide solution, sodium iodide solution, potassium chloride solution, potassium fluoride solution, potassium bromide solution, potassium iodide solution, lithium fluoride solution, lithium chloride solution, lithium bromide solution, lithium iodide solution, ammonium chloride solution, and combinations thereof. In one embodiment, the solution of halide ions comprises a solution of sodium chloride. In an embodiment, the solution of sodium chloride comprises a range of from about 0.01 to about 5 wt. % chloride ions dissolved in water.

Figure 3:
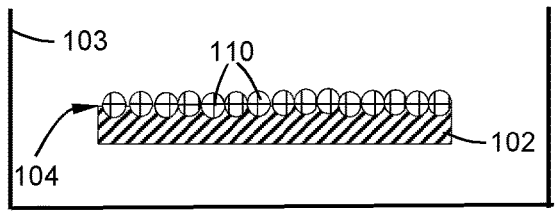
FIG. 3 illustrates a cross-sectional view of a glass substrate according to one or more embodiments.

Referring to FIG. 3, in one or more embodiments, upon contact with a solution of halide ions, the particles of silver nitrate 106 and/or the silver oxide film 108 react to form particles of silver halide (e.g. AgCl, AgI, AgBr) that are located on the top surface 104 of the antimicrobial glass substrate. In one or more embodiments, when the antimicrobial glass substrate is exposed to the halide ions, the halide ions react with one or more of silver nitrate and silver oxide to precipitate silver halide onto the antimicrobial glass substrate.

Figure 4:
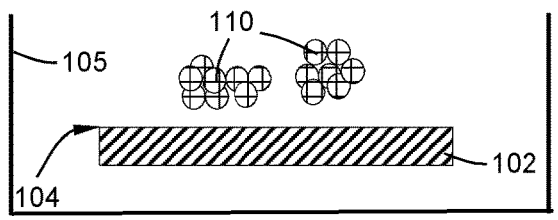
FIG. 4 illustrates a cross-sectional view of a glass substrate according to one or more embodiments.

Referring to FIG. 4, in a second ultrasonic tank 105, the antimicrobial glass substrate 102 comprising silver halide 110 is contacted with a detergent solution comprising a phosphate salt to remove the silver halide 110 from the antimicrobial glass substrate 102. In one or more embodiments, the second ultrasonic tank 105 (i.e. the tank containing the detergent solution) is operated at a frequency in a range of from about 60 to about 120 kHz.

Surprisingly, when a higher ultrasonic frequency (e.g. in a range of from about 60 to about 120 kHz) is used for the ultrasonic tank containing the solution of halide ions, treatment of the antimicrobial glass substrate with the solution of halide ions, followed by the same phosphate salt detergent does not result in the removal of the yellow discoloration. Thus, according to one or more embodiments, the second ultrasonic tank is operated at a frequency greater than the frequency of the first ultrasonic tank. In some embodiments, the ratio of the ultrasonic frequency of the second ultrasonic tank to the first ultrasonic tank is equal to or greater than 1.5 or equal to or greater than 2. Accordingly, without intending to be bound by theory, there is a synergy between the use of a lower ultrasonic frequency (i.e. in a range of from about 20 to about 40 kHz) for the ultrasonic tank containing the solution of halide ions and the use of a phosphate salt detergent in a second ultrasonic tank at a higher ultrasonic frequency (e.g. in a range of from about 60 to about 120 kHz) that results in the removal of the yellow discoloration caused by silver oxide.

In one or more embodiments, the temperature of the second ultrasonic tank is in a range of from about 22° C. to about 70° C., including from about 22° C. to about 60° C., and from about 25° C. to about 60° C. In an embodiment, the antimicrobial glass substrate comprising silver halide is contacted with the detergent solution for a period of time in a range of from about 5 to about 15 minutes. In one or more embodiments, the antimicrobial glass substrate is contacted with the detergent solution for a period of time in a range of from about 5 minutes to about 10 minutes. In one embodiment, the antimicrobial glass substrate is contacted with the detergent solution for a period of time of about 10 minutes.

In one or more embodiments, the detergent solution comprises about 5 to about 10 wt. % detergent. In one or more embodiments, the detergent solution comprises sodium hydroxide (NaOH), water, and a phosphate salt. In one or more embodiments, the phosphate salt is selected from the group consisting of sodium phosphate, sodium tripolyphosphate, sodium trimetaphosphate, sodium triphosphate, sodium hexametaphosphate, sodium pyrophosphate, potassium pyrophosphate, potassium phosphate, potassium triphosphate, potassium polymetaphosphate, and combinations thereof. Without intending to be bound by theory, it is thought that the phosphate salt detergent helps to aggregate the particles of silver halide so that the particles become larger and easier to remove. In one or more embodiments, upon aggregation of the particles of silver halide, the particles are suspended in the detergent solution, and can then be removed. Additionally, it is thought that the detergent prevents the particles of silver halide from re-depositing and being adsorbed on the surface of the antimicrobial glass substrate.

Figure 5:
FIG. 5 illustrates a cross-sectional view of a glass substrate according to one or more embodiments.

Referring to FIG. 5, after the antimicrobial glass substrate 102 comprising silver halide 110 is contacted with a phosphate salt detergent solution, the antimicrobial glass substrate 102 is rinsed with deionized water to form an antimicrobial glass substrate 102 with substantially no particles of silver oxide, silver nitrate, and/or silver halide on the surface. As used herein, the phrase "substantially no particles" or "substantially free of" means that there are <100 particles, including <90 particles, <80 particles, <70 particles, <60 particles, <50 particles, <40 particles, <30 particles, <20 particles, <10 particles, <5 particles, or 0 particles being adsorbed onto the glass. In one or more embodiment, the determination of "substantially no particles" or "substantially free of particles" is made by using the naked eye under fluorescent lamp/bright light. In one or more embodiments, the antimicrobial glass substrate is rinsed in deionized water for a period of time in a range of from about 5 to about 15 minutes. In one or more embodiments, the antimicrobial glass substrate is rinsed in deionized water for a period of time in a range of from about 5 minutes to about 10 minutes. In one embodiment, the antimicrobial glass substrate is rinsed in deionized water for a period of time of about 10 minutes. In one or more embodiments, the rinsing in deionized water occurs when there is no ultrasonic frequency. In other words, the ultrasonic baths are turn off when the antimicrobial glass substrate is rinsed with deionized water. In one or more embodiments, the deionized water is at room temperature, or is at ambient temperature, or is at a temperature in the range of from about 22° C. to about 25° C.

In one or more embodiments, the rinsed antimicrobial glass substrate is dried. In one embodiment, the rinsed antimicrobial glass substrate is dried in a stream of air. In one or more embodiments, the rinsed antimicrobial glass substrate is dried using blowers. In one or more embodiments, the rinsed antimicrobial glass substrate is dried in a stream of air using an air gun. In one or more embodiments, the rinsed antimicrobial glass substrate is dried in a stream of air using an air knife. In one or more embodiments, the rinsed antimicrobial glass substrate is dried using heat.

In one or more embodiments, the dried antimicrobial glass substrate is substantially free of yellow marks. As used herein, the phrase "substantially free of yellow marks" means that the silver oxide has reacted with the halide ion and detergent such that the silver oxide is no longer present. It is noted that the presence of the discoloration/yellowing is caused by the present of silver oxide on the glass substrate. Confirmation of the lack of yellowing/discoloration of the class is performed using the naked eye under fluorescent lamp/bright light.

Another aspect of the present disclosure is directed to a method of manufacturing an antimicrobial glass substrate. In one or more embodiments, the method of manufacturing comprises ion-exchanging silver into a glass substrate to form an antimicrobial glass substrate comprising one or more of silver nitrate and silver oxide. In a first ultrasonic tank, the antimicrobial glass substrate comprising one or more of silver nitrate and silver oxide is contacted with a solution comprising halide ions to form an antimicrobial glass substrate comprising silver halide. In one or more embodiments, the solution is selected from sodium chloride solution, sodium fluoride solution, sodium bromide solution, sodium iodide solution, potassium chloride solution, potassium fluoride solution, potassium bromide solution, and potassium iodide solution. In one or more embodiments, the first ultrasonic tank is operated at a frequency in a range of from about 20 to about 40 kHz. In one or more embodiments, in a second ultrasonic tank, the antimicrobial glass substrate comprising silver halide is contacted with a detergent solution comprising a phosphate salt to remove the silver halide. In one or more embodiments, the second ultrasonic tank is operated at a frequency in a range of from about 60 to about 120 kHz. In one or more embodiments, the antimicrobial glass substrate is rinsed in deionized water to form a rinsed antimicrobial glass substrate. In one or more embodiments, the rinsed antimicrobial glass substrate is dried to form a dried antimicrobial glass that is substantially free of silver nitrate, silver oxide, and silver halide.

The disclosure is now described with reference to the following examples. Before describing several exemplary embodiments of the disclosure, it is to be understood that the disclosure is not limited to the details of construction or process steps set forth in the following description. The disclosure is capable of other embodiments and of being practiced or being carried out in various ways.

EXAMPLES

Example 1: Method of Processing

In an ultrasonic tank, an antimicrobial glass substrate having particles of silver nitrate and silver oxides was dipped in a solution of sodium chloride (~0.01-5 wt. %). The ultrasonic tank was operated at a frequency of from about 20 to about 40 kHz.

In a second ultrasonic tank, the antimicrobial glass substrate was dipped in a detergent solution. The detergent solution, which was commercially available, contained sodium hydroxide, water, and phosphate salt. The second ultrasonic tank was operated at frequency of from about 60 to about 120 kHz. The antimicrobial glass substrate was rinsed with deionized water and dried in air.

The processing conditions are provided in Table 1:

| Condition | Dip in NaCl Solution | Dip in Detergent Solution | Dip in Deionized Water |
|---|---|---|---|
| Temperature (° C.) | 60 | 60 | 22 |
| Time (min.) | 10 | 10 | 5-10 |
| Ultrasonic Frequency (kHz) | 20-40 | 60-120 | Off |
| Concentration (wt. %) | 0.01-5 | 5-10 | — |

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A method of processing a glass substrate, the method comprising
   in a first ultrasonic tank, contacting a glass substrate comprising one or more of silver nitrate and silver oxide with a solution comprising halide ions to form glass substrate comprising silver halide;
   operating the first ultrasonic tank at a first frequency;
   in a second ultrasonic tank, contacting the glass substrate comprising silver halide with a detergent solution comprising a phosphate salt to remove the silver halide from the glass substrate; and
   operating the second ultrasonic tank at a second frequency greater than the first frequency.

2. The method of claim 1, wherein the method does not utilize mechanical scrubbing to remove silver halide or one or more of silver nitrate and silver oxide from the glass substrate.

3. The method of claim 1, wherein the solution comprises a range of from about 0.01 to about 5 wt. % halide ions.

4. The method of claim 3, wherein the solution is selected from the group consisting of sodium chloride solution, sodium fluoride solution, sodium bromide solution, sodium iodide solution, potassium chloride solution, potassium fluoride solution, potassium bromide solution, potassium iodide solution, lithium fluoride solution, lithium chloride solution, lithium bromide solution, lithium iodide solution, ammonium chloride solution, and combinations thereof.

5. The method of claim 4, wherein the solution is a sodium chloride solution.

6. The method of claim 1, wherein the detergent solution comprises a range of from about 5 to about 10 wt. % detergent.

7. The method of claim 1, wherein the phosphate salt is selected from the group consisting of sodium phosphate, sodium tripolyphosphate, sodium trimetaphosphate, sodium triphosphate, sodium hexametaphosphate, sodium pyrophosphate, potassium pyrophosphate, potassium phosphate, potassium triphosphate, potassium polymetaphosphate, and combinations thereof.

8. The method of claim 1, wherein the first ultrasonic tank and the second ultrasonic tank, independently, are operated at a temperature in a range of from about 22° C. to about 70° C. and there is a ratio of the second frequency to the first frequency greater than or equal to 1.5.

9. The method of claim 1, wherein the glass substrate is contacted with the solution comprising halide ions for a period of time in a range of from about 5 to about 10 minutes.

10. The method of claim 1, wherein the glass substrate comprising silver halide is contacted with the detergent solution for a period of time in a range of from about 5 to about 10 minutes.

11. The method of claim 1, further comprising rinsing the glass substrate with deionized water after the contacting with the detergent solution to form a rinsed glass substrate.

12. The method of claim 11, wherein the antimicrobial glass substrate is rinsed in deionized water for a period of time in a range of from about 5 to about 10 minutes.

13. The method of claim 11, further comprising drying the glass substrate after the rinsing.

14. The method of claim 13, wherein the dried glass substrate is substantially free of yellow marks.

15. The method of claim 1, wherein the first ultrasonic tank is operated at a frequency in a range of from about 20 to about 40 kHz and the second ultrasonic tank is operated at a frequency of from about 60 to about 120 kHz.

16. The method of claim 1, wherein when the glass substrate is exposed to the halide ions, the halide ions react with one or more of silver nitrate and silver oxide to precipitate silver halide onto the glass substrate.

17. The method of claim 1, wherein the detergent solution prevents the silver halide from re-depositing on a surface of the glass substrate.

18. The method of claim 1, wherein the glass substrate comprises a chemically strengthened glass.

19. A method of manufacturing an antimicrobial glass substrate comprising:
   ion-exchanging silver into a glass substrate to form an antimicrobial glass substrate comprising one or more of silver nitrate and silver oxide;
   in a first ultrasonic tank, contacting the antimicrobial glass substrate comprising one or more of silver nitrate and silver oxide with a solution comprising halide ions to form an antimicrobial glass substrate comprising silver halide, operating the first ultrasonic tank at a frequency in a range of from about 20 to about 40 kHz, then in a second ultrasonic tank, contacting the antimicrobial glass substrate comprising silver halide with a detergent solution comprising a phosphate salt to remove the silver halide, operating the second ultrasonic tank at a frequency in a range of from about 60 to about 120 kHz;
   rinsing the antimicrobial glass substrate in deionized water to form a rinsed antimicrobial glass substrate; and
   drying the rinsed antimicrobial glass substrate to form a dried antimicrobial glass that is substantially free of silver nitrate, silver oxide, and silver halide.

20. The method of claim 19, wherein the solution is selected from the group consisting of sodium chloride solution, sodium fluoride solution, sodium bromide solution, sodium iodide solution, potassium chloride solution, potassium fluoride solution, potassium bromide solution, potassium iodide solution, lithium fluoride solution, lithium chloride solution, lithium bromide solution, lithium iodide solution, ammonium chloride solution, and combinations thereof.

\* \* \* \* \*